Inventor
LEO M. H. THYSSENS

March 12, 1968   L. M. H. THYSSENS   3,373,424
TRACKING AND SYNCHRONIZING SYSTEM
Filed April 29, 1966   4 Sheets-Sheet 4

Inventor
LEO M. H. THYSSENS
By *Percy P. Lantzy*
Attorney

United States Patent Office 3,373,424
Patented Mar. 12, 1968

3,373,424
TRACKING AND SYNCHRONIZING SYSTEM
Leo Maria Hendrik Thyssens, Ekeren, Belgium, assignor to International Standard Electric Corporation, New York, N.Y., a corporation of Delaware
Filed Apr. 29, 1966, Ser. No. 546,255
Claims priority, application Belgium, Apr. 30, 1965, 663,241
22 Claims. (Cl. 343—6)

ABSTRACT OF THE DISCLOSURE

A system for determining the position and velocity vectors of a satellite or the like wherein the position is obtained by means of an interferometer system and a monopulse system, both systems being located in a main tracking station, and the velocity vector is obtained by measuring in the main and auxiliary tracking stations the Doppler frequency shifts of a carrier wave emitted in the main station and returned by the satellite transponder. The velocity measurments are synchronized in a novel manner by means of phase-locked loops located in the stations.

---

The invention relates to a tracking and synchronizing system for determining the position and velocity vectors of a tracked object with respect to a tracking station.

In the article "Spacecraft tracking and guidance techniques" by H. J. Gustin and published in "Het Ingenieursblad" No. 5, of 1965, a method is described for determining the distance between the tracking station and the tracked object by measuring the phase shift of a signal travelling from the tracking station to the object and vice-versa. In this article it is further mentioned that the angles between the direction from the tracking station to the tracked object and two reference axes in the tracking station may be measured by means of an interferometer system, the measurement being then accurate but ambiguous or with a monopulse system in which case the measurement is less accurate but non ambiguous. Finally, in this article it is also disclosed that the radial velocity component of the velocity vector may be measured by determining the Doppler frequency shift to which a signal is subjected when travelling from the tracking station to the tracked object and vice-versa.

An object of the invention is to provide a tracking and synchronizing system wherein the velocity vector is determined in a very accurate way.

Another object of the invention is to provide a tracking and synchronizing system wherein the matter disclosed in the above mentioned article is applied in a judicious way such that a system is obtained which is relatively simple and sufficiently accurate.

The system according to the invention is particularly characterized in that said tracking station includes means for sending signals to said tracked object and for receiving these signals from said object and means for determining said position vector, that said system includes two auxiliary tracking stations, that said main tracking station and said two auxiliary tracking stations each include means for measuring the radial velocity component of said velocity vector, each velocity component being measured in the direction from the auxiliary station to said object and said velocity vector being determined by means of said radial velocity components, and that said system includes communication means for generating fully synchronized reference signals in said main station and in each of said auxiliary stations in order to synchronize the measurements of said radial velocity components.

The above mentioned and other objects and features of the invention will become more apparent and the invention itself will be best understood by referring to the following description of embodiments taken in conjunction with the accompanying drawings in which.

Figure 1:
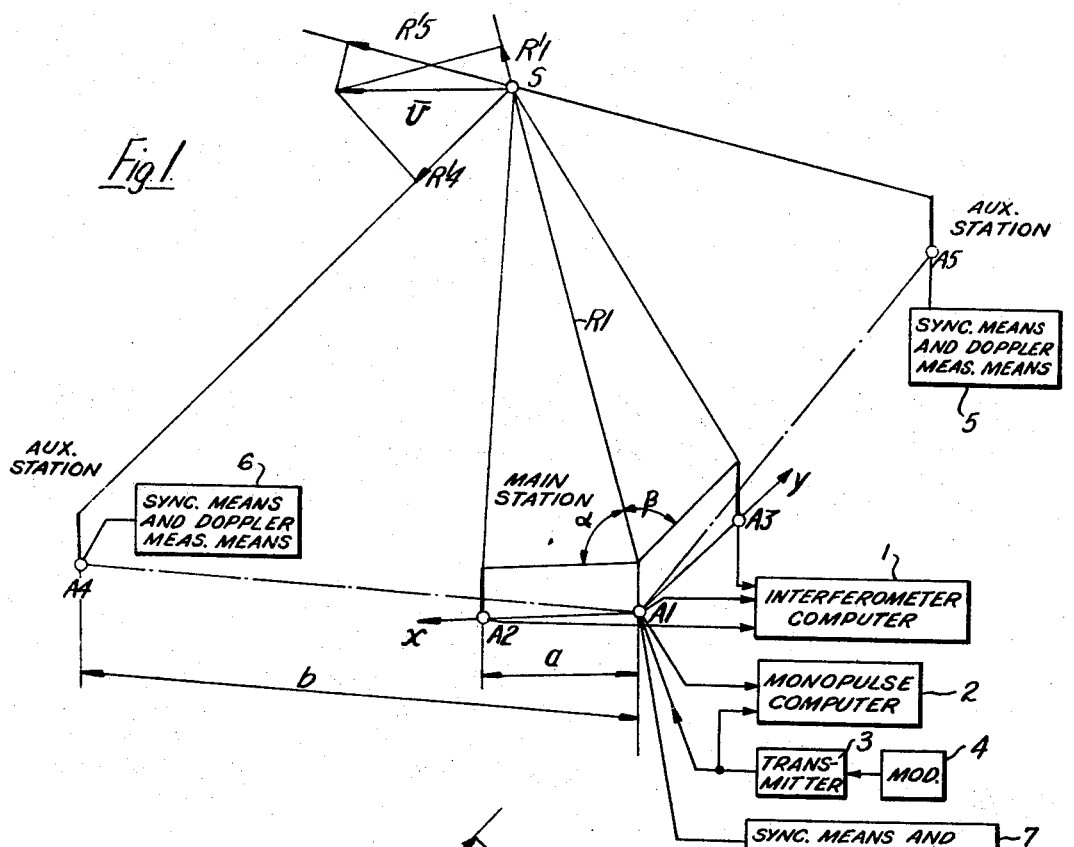
FIG. 1 is a schematic diagram of an embodiment of a tracking and synchronizing system according to the invention.

Principally referring to FIG. 1 the tracking and synchronizing system includes a fixed main tracking station, hereinafter called main station, and two fixed auxiliary tracking stations, hereinafter called auxiliary stations. The main station includes an antenna (not shown) which is capable of transmitting in a continuous manner a carrier wave of 1.5 gHz. to the tracked object, i.e. a satellite S. This satellite moves with a certain velocity with respect to these stations.

The main station further includes three antennas A1, A2 and A3, the antennas A2 and A3 being positioned at equal distances $a$ of e.g. 16 meters from the antenna A1 and the antennas A2, A1 and A1, A3 determining two reference axes $x$ and $y$ which are at right angles with respect to each other. The auxiliary stations include the antennas A4 and A5 respectively, these antennas being positioned at equal distances $b$ of e.g. 30 kilometers from the antenna A1.

The antennas A1, A2 and A3 form part of an interferometer system which is capable of measuring the angles $\alpha$ and $\beta$ shown in an accurate but ambiguous manner. This type of interferometer system is well known in the art and is generally shown as block 1 (interferometer computer) coupled to antennas A1, A2 and A3 in FIG. 1. Signals received from the transponder of satellite S are received by antennas A1, A2 and A3 and are fed to the interferometer computer, wherein the phase differences between the signals received by A1 and A2 and by A1 and A3 are computed, these phase differences being a measure of the angles $\alpha$ and $\beta$, respectively. This type of system being well known in the art is therefore not described in more detail herein. In order to remove the ambiguity but to maintain the accuracy, the antenna A1 further forms part of a monopulse system which is capable of measuring the angles $\alpha$ and $\beta$ in a less accurate but non ambiguous manner. This type of monopulse system is also well known in the art and is shown generally in FIG. 1 by a monopulse computer 2 and a modulator 4 and transmitter 3, each element being coupled to antenna A1. The monopulse system also includes a directional antenna (also well known in the art and which is shown generaly by antenna A1) which is adapted to follow the satellite S, the signals being received from the satellite S being fed to the monopulse computer 2 which computes the angles $\alpha$ and $\beta$ from these received signals. Instead of mounting the monopulse system in the main station, it may alternatively be placed in one of the auxiliary stations.

The antennas A1, A4 and A5 are each capable of receiving a carrier wave which is transmitted from the main station by transmitter 3 and which upon receipt by a sender-receiver (transponder) located in the satellite is retransmitted without phase shift or with a known phase shift. Upon receipt of this re-transmitted carrier wave by the antennas A1, A4 and A5, the respective radial velocity component of the velocity vector is derived therefrom by means of the Doppler measuring means 7, 6 and 5 respectively. The details of these systems and of the synchronizing system also represented by blocks 5, 6 and 7, appears below. In FIG. 1 the thus determined velocity components of the velocity vector in the main and auxiliary stations are indicated by $R'1$, $R'4$ and $R'5$.

Finally, in the main station the carrier wave transmitted by the antenna A1 is phase-modulated by a plurality of side tones in modulator and transmitter 3 in order to determine the distance from the main station to the satellite. This determination is performed in the interferometer computer 1 by determining the phase difference between the transmitted and received signals, a technique well known in the art. In FIG. 1 this distance is indicated by R1. Antenna A1 is adapted to operate with the monopulse system, the interferometer system and the modulated carrier system, thereby eliminating the need for individual antennas.

By means of the distance R1 to the satellite and of the two angles $\alpha$ and $\beta$ the instantaneous position of the moving satellite is determined as the intersection point of two conical surfaces having angles $\alpha$ and $\beta$ measured between the rotation axes of these surfaces and the generators thereof and of a spherical surface with radius R1. The direction of the velocity vector is determined by means of its three components $R'1$, $R'4$ and $R'5$ as shown in FIG. 1.

Figure 2:
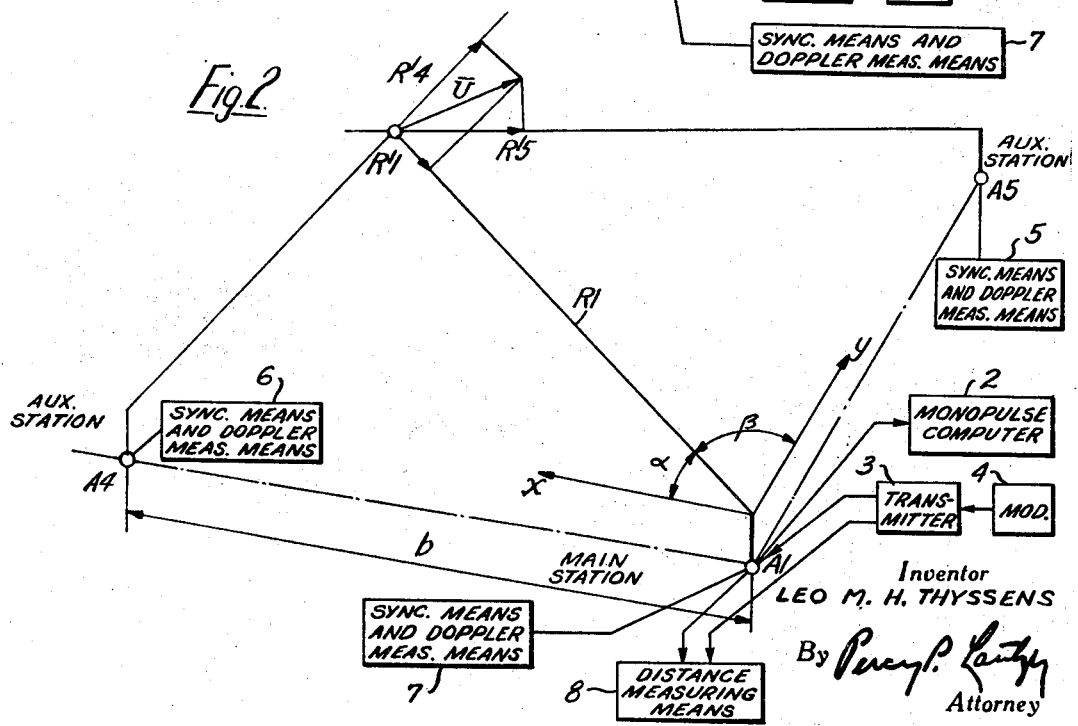
FIG. 2 is a schematic diagram of a modified embodiment of a tracking and synchronizing system according to the invention.

Instead of combining an interferometer system with a monopulse system mounted in the main station for determining the angles $\alpha$ and $\beta$, one may also eliminate this interferometer system. The resultant system is represented in FIG. 2. Corresponding structural elements in FIGS. 1 and 2 are given the same reference designation for convenience of explanation. The measurement of the angles $\alpha$ and $\beta$ by the monopulse system is less accurate, but the resultant system is much simpler than that of FIG. 1. In this embodiment, distance measuring means 8 is provided to measure the phase difference between the transmitted and received signals. This type of device is well known in the art and a more detailed descripton thereof is deemed unnecessary for a proper understanding of this invention. Hereby it should be noted that the accurate determination of the position of a satellite is less important than that of the velocity vector of this satellite.

Figure 3:
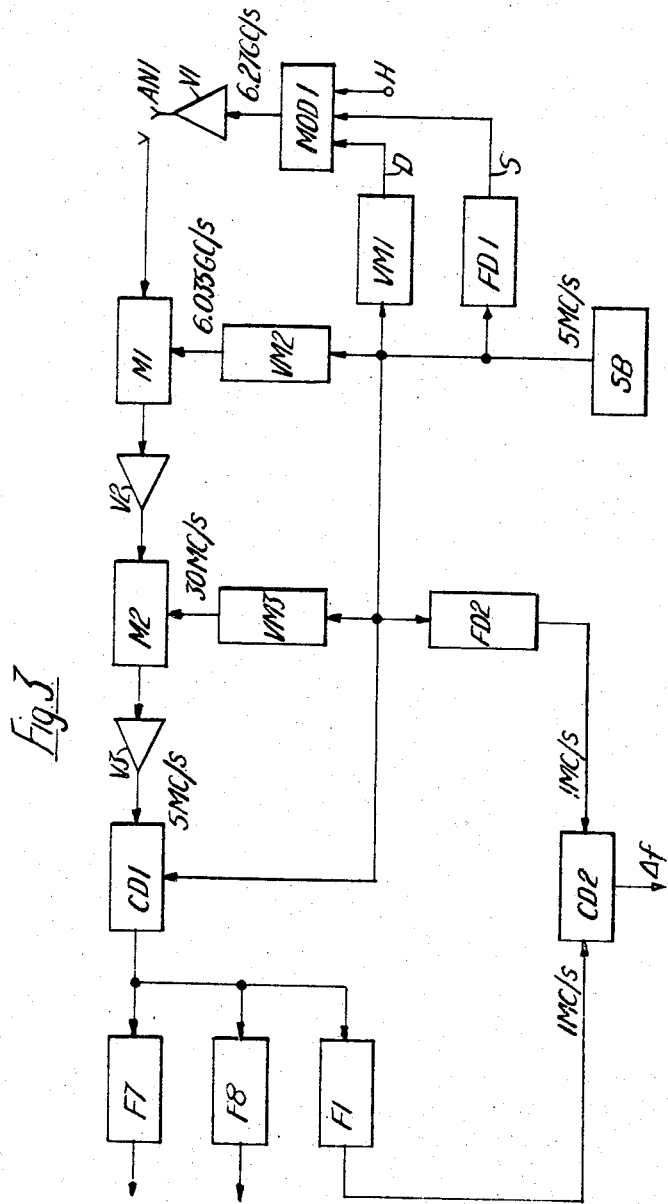
FIG. 3 is a block diagram of means included in the main tracking station of a system according to the invention.
Figure 4:
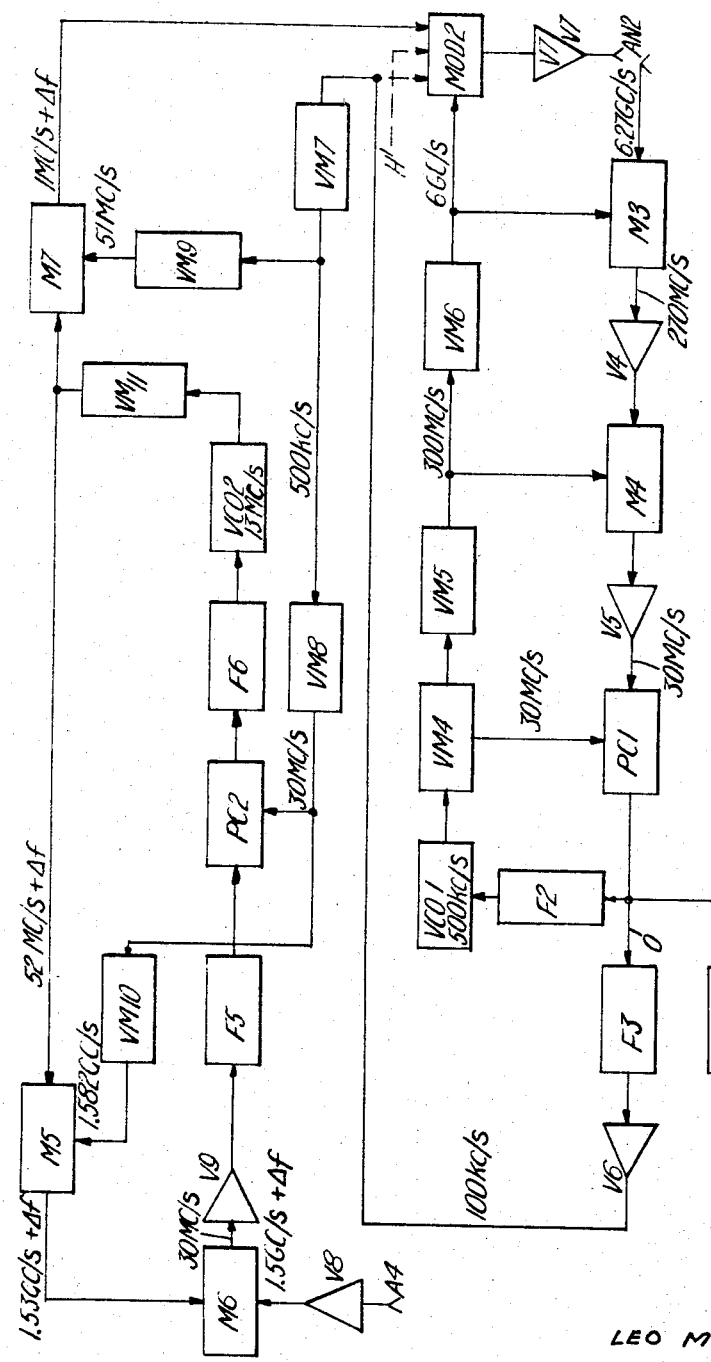
FIG. 4 is a block diagram of means included in an auxiliary tracking station of a system according to the invention.

Principally referring to FIGS. 3 and 4, a description is given hereinafter of the means which are mounted in the main station and in each auxiliary station for synchronizing the measurements of the Doppler frequency shifts. More particularly, the operation of the main station in conjunction with the auxiliary station including antenna A4 is considered and described. The operation of the main station in conjunction with the auxiliary station including antenna A5 is analogous and will therefore not be described.

The main station and the auxiliary station considered are in communication with one another by means of a radio link including the antenna AN1 in the main station (FIG. 3) and the antenna AN2 in the auxiliary station (FIG. 4), these antennas being directed towards one another.

The main station (FIG. 3) includes a signal source SB emitting a signal with a fixed frequency of 5 mc./s. From this signal are derived the following five signals with fixed frequency: the carrier wave D with a frequency of 6.27 gHz. obtained by multiplication by 1254 in the multiplication stage VM1, the synchronizing signal S with a frequency of 100 kc./s. obtained by dividing by 50 in the frequency divider FD1, the reference signal with a frequency of 6.035 gHz. obtained by multiplication by 1207 in the multiplication stage VM2, the reference signal with a frequency of 30 mc./s. obtained by multiplication by 6 in the multiplication stage VM3, and finally the reference signal with a frequency of 1 mc./s. obtained by dividing by 5 in the frequency divider FD2.

By means of the modulator MOD 1 the synchronizing signal S and one or more auxiliary signals are modulated on the carrier wave D. Such an auxiliary signal is for instance the signal H which comprises information concerning the position wherein the antenna A4 must be placed in order that the receipt of the carrier wave re-emitted by the satellite transponder should be optimum. Such an information is provided by a computer device (not shown) mounted in the main station and is determined by the position of the satellite S and the location of the auxiliary station. The thus modulated carrier wave with a frequency of 6.27 gHz. is amplified in amplifier V1 and then emitted by the antenna AN1 (FIG. 3) towards the auxiliary station wherein this signal is received by the antenna AN2 (FIG. 4). The received signal at the auxiliary station (see FIG. 4) is applied to the input of a mixer stage M3 which forms together with the mixer M4, the multipliers VM4, VM5, VM6, the amplifiers V4 and V5, the filter F2, the voltage-controlled oscillator VCO1 and the phase comparator PC1 a phase-locked loop at the output O of which only appear the modulating signals of the carrier wave i.e. the synchronizing signal S and the auxiliary signal H, these signals having the same frequency as in the main station although the carrier wave frequency may have been slightly changed during its travel from the main station to the auxiliary station. This will become clear from the following. The frequency of 6.27 gHz. of the carrier wave is reduced to 270 mc./s. by mixing with a frequency of 6 gHz. in mixer M3. The thus obtained signal is amplified in amplifier V4 and its frequency is reduced to 30 mc./s. by mixing with a frequency of 300 mc./s. in mixer M4. The thus obtained signal is applied to the one input of the phase comparator PC1 the output of which is fed back to the other input of PC1 via the filter F2, the voltage-controlled oscillator VCO1 having a frequency of 500 kc./s. and the multiplier VM4 which performs a multiplication by 60. The operation of the above phase-locked loop is well known and is such that the signals applied to both inputs of the phase comparator normally accurately have the same frequency and phase due to the fact that the output signal of the oscillator, and hence of the multiplier VM4, accurately follows the input signal, i.e. the output signal of amplifier V5. Due to the frequency and phase stability of the phase-locked loop also the signals derived therefrom will be locked in phase and frequency. This is the case for the frequencies of 300 mc./s. and 6 gHz. appearing at the outputs of the multiplier stages VM5 and VM6 respectively.

When a phase difference occurs between the two input signals with same frequency applied to phase comparator PC1, a signal including a DC voltage component appears at the output of this phase comparator PC1. This DC voltage is proportional to the above phase difference and eliminates this phase difference due to the existence of the feedback circuit comprising F2, VCO1 and VM4. Since the input signals of the phase comparator normally have the same frequency and phase no carrier wave will appear at the output of this phase comparator, even when this carrier wave might have been subjected to a frequency shift during its transmission from the main station to the auxiliary station. At this output therefore only appear the synchronizing signal S and the auxiliary signal H, these signals having a phase shift $\Delta\varphi$ with respect to the same signals in the main station due to their travel from the latter station to the auxiliary station.

Phase-locked loops are described for instance in "Electrical Communication," volume 39, No. 1, 1964, and more particularly in the articles "Communication Receiver for Satellite Ground Station," by H. Sassler and R. Surenian and "Terrestrial Navigation by Artificial Satellites," by P. C. Sandretto.

The auxiliary signal H is filtered out by means of filter F4 and is used (not shown) for controlling the antenna A4. The synchronizing signal S is filtered out by means of filter F3 and is then amplified in amplifier V6. This synchronizing signal has a frequency of 100 kc./s. and a phase shift $\Delta\varphi$. From this signal are derived a first reference signal with a frequency of 500 kc./s. obtained by multiplying by 5 in multiplier stage VM7, a second reference signal with a frequency of 30 mc./s. obtained by an additional multiplication by 6 of the 500 kc./s. signal in the multiplier stage VM8, a third reference signal with a frequency of 51 mc./s. obtained by the multiplication by 102 of the 500 kc./s. signal in the multiplier stage VM9, and finally a fourth reference signal with a frequency of 1.582 gHz. obtained by a multiplication of the 30 mc./s. reference signal in the multiplication stage VM10. These four reference signals control a phase-locked loop the aim of which is to determine the Doppler frequency shift. An analogous loop is described in the above article by P. C. Sandretto.

This phase-locked loop includes a phase comparator PC2 to the one input of which is applied the reference signal of 30 mc./s., this one input constituting the input of the loop. A signal is fed back to the other input of the phase comparator PC2 as will become clear from the following. The output of the phase comparator PC2 is coupled with the output of the loop via the filter F6, the voltage-controlled oscillator VCO2 with a frequency of 13 mc./s. and a multiplier stage VM11 performing a multiplication by 4. This last output is fed back to the other input of the phase comparator PC2 via the mixer M5, to which is applied the reference signal with a frequency of 1.582 gHz., the mixer M6 to which is applied the signal received by antenna A4 and amplified by amplifier V8, the amplifier V9 and the band pass filter F5. The signal applied to the loop via the antenna A4 and the mixer M6 may be considered as a disturbing signal for the loop, this disturbing signal comprising the Doppler frequency shift $\Delta f$ on the carrier wave of 1.5 gHz. By means of the loop this Doppler frequency shift $\Delta f$ appears at the output of this loop on a carrier wave of 52 mc./s. The loop is not described in detail and only the freqencies of the signals appearing at the outputs of the various elements of this loop are indicated.

The frequency of the carrier wave of the output signal of the loop is reduced to 1 mc./s. in the mixer M7 due to the reference signal with a frequency of 51 mc./s. being applied to this mixer.

The carrier wave signal of 1 mc./s. and with Doppler frequency shift $\Delta f$ is applied to the modulator MOD2 and is modulated, together with eventual auxiliary signals H1, e.g. a telephone conversation, on the carrier wave of 6 gHz. appearing at the output of the multiplier WM6. After amplification in amplifier V7 the thus modulated carrier wave is transmitted to the main station by means of the antenna AN2. In this station the modulated signal is received by the antenna AN1 and the frequency of 6 gHz. of this carrier wave is successively reduced to 35 mc./s. and 5 mc./s. by mixing with the reference signals of 6035 gHz. and 30 mc./s. in the mixers M1 and M2 respectively. Between the mixers M1 and M2 and behind the mixer M2 the signal is amplified in the amplifiers V2 and V3. The output signal of the amplifier V3 is applied, together with the reference signal of 5 mc./s., to a coherent detector CD1 such that at the output of the latter only appear the modulating signals i.e. the 1 mc./s. signal with $\Delta f$ and the above auxiliary signal H'. The auxiliary signal H' is filtered out by filter F7, whereas the signal of 1 mc./s. with Doppler frequency shift $\Delta f$ is filtered out by filter F1. The output of the filter F1 and the reference signal of 1 mc./s. are applied to a coherent detector CD2 so that only the Doppler frequency shift $\Delta f$ appears at the output of this detector.

In the main station and in the other auxiliary station the Doppler frequency shift with respect to a reference frequency of 1 mc./s. is determined in an analogous manner. It is clear that since in the various stations the reference signals completely have the same frequency, the measurements of these shifts are fully synchronized. Therefore the radial velocity components and hence also the radial velocity vector are determined in an accurate manner.

Instead of synchronizing the measurements of the Doppler frequency shifts in the above described manner one could arrange an atomic clock in the main station as well as in each of the auxiliary stations. Although these atomic clocks may be fully synchronized at the start of a measurement a frequency shift appears after a certain time interval between the reference signals controlling in each station the device for measuring the Doppler frequency shift. These Doppler frequency shifts are hence measured with respect to reference signals which are different in frequency so that this entails an inaccuracy in the measurement of the radial velocity components R'1, R'4, R'5 and hence of the velocity vector.

In the computer device of the main station it may be interesting to know the values R'4−R'1 and R'5−R'1 in order to be able to correct the velocity vector. When R'1, R'4 and R'5 are obtained separately from the corresponding Doppler frequency shifts and when the above differences are then calculated the error on the result is relatively large due to the error on each of the terms. Therefore it is preferably to determine in the main station the differences of the Doppler frequency shifts and to calculate directly therefrom the values R'4−R'1 and R'5−R'1. In order to measure in the main station the difference between the Doppler frequency shifts in the main station and in the auxiliary station of FIG. 4, for instance, it is sufficient to replace in FIG. 3 the reference signal of 1 mc./s. applied to the detector CD2 by the signal of 1 mc./s. with Doppler frequency of the main station.

As mentioned above the synchronizing signals in the various stations are fully synchronized in frequency, but the synchronizing signal in each station has a phase shift $\Delta\varphi$ with respect to the synchronizing signal in the main station, this phase shift being due to the travel from the main station to the auxiliary station. In case the signals received in the auxiliary station must be in phase with those of the main station one proceeds as follows. In the auxiliary station the synchronizing signal with a frequency of 100 kc./s. and a phase shift $\Delta\varphi$ is modulated on the carrier wave of 6 gHz. in the modulator MOD2 and is received in the main station in an analogous manner as the signal with Doppler frequency shift. The synchronizing signal with a frequency of 100 kc./s. thus appears at the output of the detector CD1 and is filtered out by means of filter F8. The phase shift of this synchronizing signal with respect to the synchronizing signal from which it was derived has become $2\Delta\varphi$ due to the travel from the auxiliary station to the main station.

Figure 5:
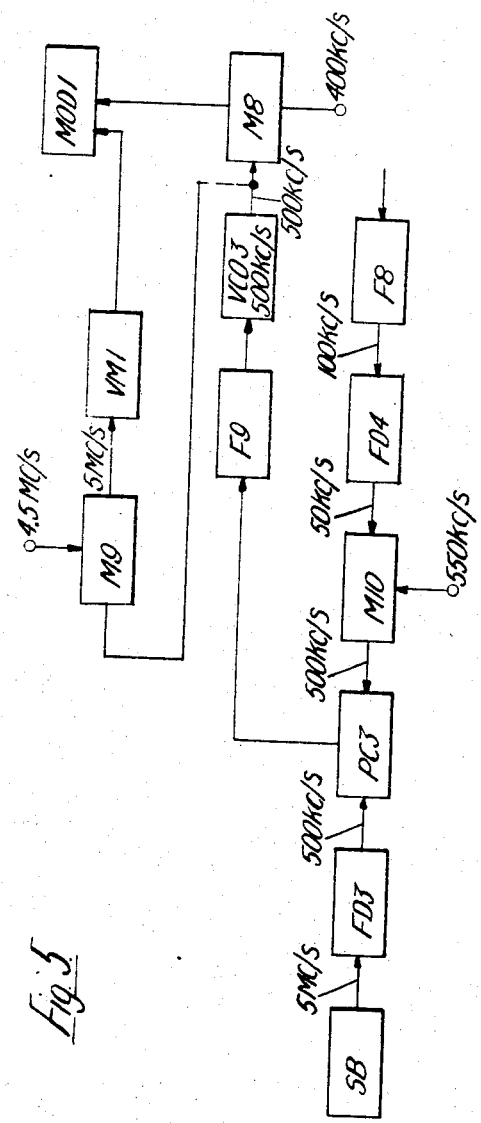
FIG. 5 shows a modification of a part of the means represented in FIG. 3.

Principally referring to FIG. 5 this signal appearing at the output of filter F8 is applied to a frequency divider FD4 which divides by 2, so that a signal with a frequency of 50 kc./s. and with a phase shift equal to Δφ appears at the output of this divider. This signal is mixed in mixer M10 with a reference frequency of 550 kc./s. due to which an output signal is produced with a frequency of 500 kc./s. and with a phase shift of 360°−Δφ. This signal is applied to one input of a phase comparator PC3. The reference frequency of 5 mc./s. is applied to a frequency divider FD3, which divides by 10, due to which a reference frequency of 500 kc./s. is obtained. This last frequency is applied to the other input of the phase comparator PC3. At the output of the phase comparator PC3 thus appears a signal including a DC component which is proportional to the phase difference 360°−Δφ. This DC signal is applied via a filter F9 to a voltage-controlled oscillator VCO3 with a frequency of 500 kc./s. and the output signal of this oscillator is mixed in a mixer M8 with a reference frequency of 400 kc./s. Consequently a synchronizing signal with a frequency of 100 kc./s. but with a phase shift of 300°−Δφ appears at the output of this mixer. The circuit of FIG. 5 thus realizes a phase inversion. The obtained signal is modulated on the carrier wave of 6.27 gHz. and by the phase shift of Δφ produced by the travel over the transmission way the synchronizing signals in the main and auxiliary stations are completely in phase. It should be noted that with the circuit of FIG. 5 there is in fact realized a phase-locked loop between the main station and the auxiliary station, this loop including the radio link. Indeed, the output of the phase comparator PC3 is fed back to its input via the following elements: F9, VCO3, M8, MOD1, AN1, AN2, M3, V4, M4, V5, PC2, F9, V6, MOD2, AN2, AN1, M1, V2, M2, V3, CD1, F8, FD4 and M10.

Once the above mentioned phase shift Δφ has been determined each signal e.g. the carrier wave of a television signal, may be emitted in the main station with a phase shift of 360°−Δφ. More particularly the carrier wave of 6.27 gHz. with a phase shift of 360°−Δφ may be applied to the modulator MOD1. Such a carrier wave is for instance obtained by applying the signal with a frequency of 500 kc./s. and with a phase shift of 360°−Δφ appearing at the output of the voltage-controlled oscillator VCO3 in FIG. 5 to the mixer M9 to which also a reference signal of 4.5 mc./s. is applied. Thus a signal with a frequency of 5 mc./s. and with a phase shift of 360°−Δφ appears at the output of this mixer M9. The frequency of this signal is then increased to 6.27 gHz. by multiplication in the multiplier stage VM1 of FIG. 3 and applied to the modulator MOD1.

While the principles of the invention have been described above in connection with specific apparatus, it is to be clearly understood that this description is made only by way of example and not as a limitation on the scope of the invention.

I claim:
1. A tracking and synchronizing system for determining the position and velocity vectors of a tracked object having a transponder therein with respect to a tracking station, said tracking station comprising:
   a main tracking station;
   first and second auxiliary tracking stations;
   means coupled to said main and auxiliary tracking stations for sending signals to said tracked object;
   means at said main and auxiliary tracking stations for receiving signals returned from said tracked object;
   means at said main tracking stations for determining the position vector of said object with respect to said main tracking station;
   means at each of said main and auxiliary tracking stations responsive to the returned signals from said tracked object for measuring the radial velocity component of the velocity vector of said object with respect to each of said stations, each said velocity component being measured in the direction from the respective station to the tracked object;
   means coupled to said measuring means for computing the velocity vector of said tracked object from said radial velocity components; and
   synchronizing means including means coupled to said measuring means for generating synchronized reference signals in said main station and in each of said auxiliary stations and for transmitting said synchronized reference signals from said main station and from each of said auxiliary stations to synchronize the measurements of said respective radial velocity components.

2. A tracking and synchronizing system according to claim 1 wherein said means at said main tracking station for determining said position vector comprises:
   means for measuring the distance from said main station to said tracked object;
   means at said main station for providing two reference axes; and
   means coupled to said distance measuring means and to said axes providing means for measuring the angles between said position vector and said two reference axes.

3. A tracking and synchronizing system according to claim 2 wherein said means at said main tracking station for measuring said angles includes an interferometer system having three antennas, the positions of said antennas determining the location of said reference axes.

4. A tracking and synchronizing system according to claim 3 wherein one of said auxiliary tracking stations includes a monopulse navigation system.

5. A tracking and synchronizing system according to claim 2 wherein said means at said main tracking station for measuring said angles includes a monopulse navigation system.

6. A tracking and synchronizing system according to claim 2 wherein said means at said main tracking station for measuring the distance from said main station to said tracked object includes:
   means coupled to said signal sending means at said main station for phase-modulating side tones of said signals; and means for measuring the phase shift of said modulated side tones upon receipt of said signals from said tracked object, said phase shift being determinative of said distance between said main tracking station and said tracked object.

7. A tracking and synchronizing system according to claim 2 wherein said means at each station for measuring said radial velocity components includes means for measuring the value of the Doppler frequency shift occurring in said returned signals, said Doppler frequency shift being determinative of said radial velocity component at each of said stations.

8. A tracking and synchronizing system according to claim 7 wherein said main tracking station further includes means for measuring the difference between the Doppler frequency shift measured in each of said auxiliary tracking stations and the Doppler frequency shift measured in said main tracking station.

9. A tracking and synchronizing system according to claim 7 wherein said Doppler frequency shifts in each station are measured with respect to said fully synchronized reference signals.

10. A tracking and synchronizing system according to claim 1 wherein said synchronization means includes:
   at said main tracking station:
      means for generating a first reference signal;
      means coupled to said first reference signal generator for transmitting said first reference signal to each of said auxiliary tracking stations; and
   at each of said auxiliary tracking stations:
      means for receiving said transmitted first reference frequency signals;
      a first phase-locked loop;

means for applying said received first reference signal to said first phase-locked loop, the output signal of said first phase-locked loop being a second reference signal which is synchronized in frequency with said first reference signal generated in said main tracking station.

11. A tracking and synchronizing system according to claim 10 wherein said synchronization means and said responsive means further includes:
at said main station:
means coupled to said first reference signal generator for generating a first carrier wave;
a first modulator coupled to said first reference signal generator and to said carrier wave source for modulating said carrier wave with said first reference signals;
means coupling said modulator to said transmitting means for transmitting said modulated carrier wave to said auxiliary tracking stations; and
at each of said auxiliary stations:
mtans for receiving said modulated carrier wave;
means coupled to said receiving means for measuring the Doppler frequency shift of said received carrier wave;
means for generating a second carrier wave; and
a second modulator coupled to said measuring means and to said second carrier wave generator for modulating said second carrier wave with a signal representative of the measured Doppler frequency shift.

12. A tracking and synchronizing system according to claim 11 wherein said first phase-locked loop includes:
a phase comparator;
means coupling said received first reference signal to one input of said phase comparator;
a filter;
a voltage controlled oscillator coupled to said filter;
means coupling the output of said voltage controlled oscillator to the other input of said phase comparator; and
means coupling the output of said phase comparator to the input of said voltage controlled oscillator via said filter, the output of said phase comparator being the output of said first phase locked loop.

13. A tracking and synchronizing system according to claim 12 wherein:
said second carrier wave generator includes a voltage controlled oscillator; and
said means for measuring the Doppler frequency shift of the signals received from said tracked object at each of said auxiliary tracking stations includes:
a second phase-locked loop;
means coupling the output of said second phase-locked loop and of said voltage controlled oscillator to the inputs of said second modulator; and
further comprising:
means coupled to said second modulator for transmitting the output signal from said second modulator to said main station.

14. A tracking and synchronizing system according to claim 13 wherein said Doppler frequency shift measuring means further includes:
a mixer coupling the output of said second phase-locked loop to the input of said second modulator; and
means coupling the output of said second reference signal generator to another input of said mixer.

15. A tracking and synchronizing station according to claim 13 wherein said synchronization means and said responsive means at said main tracking station further includes:
means for receiving the output signal of said second modulator which is transmitted from said auxiliary station;

means coupled to said receiving means for demodulating said received signals; and
filter means coupled to said demodulator means, the output signal from said filter means determining the Doppler frequency shift.

16. A tracking and synchronizing system according to claim 13 wherein said synchronization means and said Doppler frequency shift measuring means further comprises at said axuiliary station:
means coupling the output of said first phase-locked loop to one input of said second modulator; and
means coupled to the output of said second modulator for transmitting the output signal thereof to said main tracking station.

17. A tracking and synchronizing system according to claim 16 wherein said synchronization means at said main tracking station further includes:
means for receiving the transmitted signals from said second modulator in each of said auxiliary tracking stations;
means coupled to said receiving means for demodulating said signals received from said second modulators; and
means coupled to said demodulating means for separating said second reference signals which are phase leading or lagging with respect to said first reference signals generated in said main tracking station.

18. A tracking and synchronizing system according to claim 13 wherein said second phase-locked loop includes:
a second phase comparator;
means coupling one input of said phase comparator to said reference signal generator;
a second filter coupled to the output of said second phase comparator;
a second voltage controlled oscillator coupled to the output of said second filter;
a mixer;
a third filter coupled to the output of said mixer;
means coupling the output of said second phase comparator to an input of said mixer;
means coupling the output of said second filter to another input of said second phase comparator; and
means coupling said signals having said Doppler frequency shift to the other input of said mixer.

19. A tracking and synchronizing system according to claim 11 wherein said modulating signals are frequency modulated on respective first and second carrier waves in said first and second modulators.

20. A tracking and synchronizing system according to claim 11 further wherein said auxiliary signals are modulated on said first and second carrier waves by said first and second modulators, respectively, at said main and auxiliary tracking stations.

21. A tracking and synchronizing system according to claim 1 wherein said synchronization means includes:
at said main tracking station:
means for transmitting a signal from a main tracking station to an auxiliary tracking station; and
at at least one of said auxiliary tracking stations:
first means for receiving the signal transmitted from said main tracking station;
means coupled to said receiving means for determining the phase shift to which said transmitted signal was subjected during its travel from said main tracking station;
a phase shift circuit coupled to said receiving means;
a carrier wave generator;
means coupling said phase shift circuit to said carrier wave generator to compensate for the phase shift of said carrier wave by an amount proportional to said determined phase shift; and
means coupled to said carrier wave generator for transmitting said phase shifted carrier wave to said main tracking station.

22. A tracking and synchronizing system according to claim 21 wherein said synchronization means at said main tracking station further includes:
- second means for receiving said phase shifted carrier wave from said at least one auxiliary tracking stations;
- a phase shift circuit coupled to said second receiving means to derive reference signals with half the phase shift of said received phase shifted carrier wave; and
- means for transmitting said reference signals to each of said auxiliary tracking stations.

References Cited

UNITED STATES PATENTS

| | | | |
|---|---|---|---|
| 2,952,846 | 9/1960 | Tear et al. | 343—8 X |
| 3,140,487 | 7/1964 | Ford et al. | 343—8 |
| 3,226,713 | 12/1965 | Sorkin et al. | 343—6 |
| 3,242,487 | 3/1966 | Hammack | 343—8 X |
| 3,246,328 | 4/1966 | Alsberg et al. | 343—8 |
| 3,308,380 | 3/1967 | Graves et al. | 343—8 X |

RODNEY D. BENNETT, *Primary Examiner.*

C. L. WHITHAM, *Assistant Examiner.*